R. H. MANSON.
AUTOMATIC BRAKE FOR TALKING MACHINES.
APPLICATION FILED JUNE 24, 1916.

1,274,735.

Patented Aug. 6, 1918

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

AUTOMATIC BRAKE FOR TALKING-MACHINES.

1,274,735.  Specification of Letters Patent.  Patented Aug. 6, 1918.

Application filed June 24, 1916.  Serial No. 105,530.

*To all whom it may concern:*

Be it known that I, RAY H. MANSON, a citizen of the United States, residing at Elyria, in the county of Lorain and State of Ohio, have invented certain new and useful Improvements in Automatic Brakes for Talking-Machines; and I do hereby declare the following to be a full, clear, and exact description of the invention, such as will enable others skilled in the art to which it appertains to make and use the same.

My invention relates to means for automatically braking or stopping the record disk of a talking machine. I aim to produce such a device which will be concealed from view, and yet which will be accessible, which is positive in its operation and which is simple and cheap to make.

Other objects of my invention and the invention itself will probably be better understood from a description of an embodiment of the invention.

Figure 1:
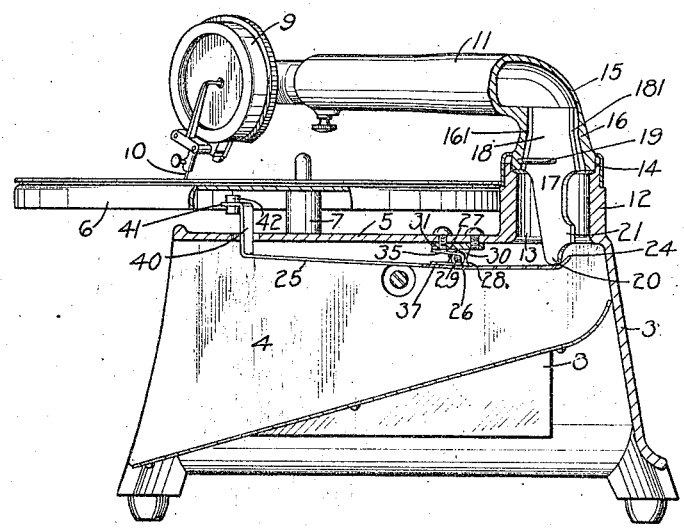
Figure 1 is an end view of a talking machine equipped with an embodiment of my invention, showing the brake in idle position and the talking machine in operation.

Referring now to the drawing and to the embodiment of the invention shown therein, at 3 is shown the frame of a talking machine. At 4 is shown the horn, which in the embodiment illustrated is concealed below the top 5 of the talking machine. The rotatable talking record support or disk is shown at 6, being mounted upon a stud 7 upon which it rotates when released, being impelled by a suitable motor, which may be concealed in the casing 8. The sound box is shown at 9 and the stylus at 10. The sound arm is shown at 11 and is connected to the horn 4 in the embodiment illustrated through a boss 12 on the top of the talking machine. This boss preferably consists of a hollow cylinder which communicates at 13 with the horn, and to whose top the sound arm 11 is pivoted at 14. The connection is such as to permit the sound arm to rock both vertically and horizontally with respect to the frame. The sound arm is provided with an elbow 15, to the short leg 16 of which the boss 12 is pivoted. The arm 11 is provided with a cam finger 17, which in the form shown, is made of a plate having a portion 18 adapted to fit in the bore of the short arm 16 of the sound arm 11. The upper portion 18 is shaped like the projection of an hour-glass, being wider at each end than in the middle or waist part 181. The bore of the leg 16 is reversely shaped to form a projection 161 fitting into the waist 181 and holding the cam finger 17 in place. The member 17 is preferably made thin, and mounted parallel or substantially parallel to the direction of travel of the sound waves, so as not to obstruct the passage of such waves through the sound duct. A pin 19 is employed to aid in securing the finger 17 in position in the sound arm. The lower end of the finger 17 is provided with a cam 20 and a stop 21. When the arm 11 is at rest, the stop 21 strikes a rest 22, which in the form shown consists of a portion of the boss 12 and limits the downward movement of the sound arm 11, and in fact, determines its position when the talking machine is in idle position.

The cam 20 is preferably rounded at 23 where it engages a cam 24 on the end of the main brake member 25. In the form shown the brake member consists of a flat strip 25 and the cam 24 is formed by turning up one end of the strip to a suitable angle. The strip is pivoted at 26 to the frame, in the embodiment shown, to the underside of the top at 27. Ears 28 are turned up, being preferably made integral with the strip 25 and a pivot pin 29 passes through these ears and the ears 30 upon a bracket 31, which is connected to the underside of the top 5 of the machine by any suitable means, such as screws 32.

Means are provided for normally holding the brake in idle position and for moving it to idle position when released. These means are shown at 35 and here consist of a coil spring, the coiled portion of which surrounds the pin 29. One end 37 of this spring engages the member 25 and the other end 38 engages the bracket 31. The other end of the member 25 is preferably provided with a vertical or substantially vertical hand 40, which is provided with a brake shoe 42 which engages the underside of the record support.

Figure 2:
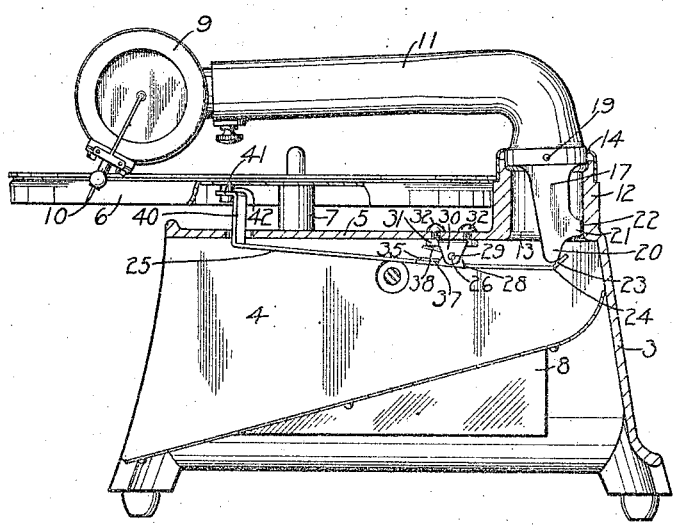
Fig. 2 is the same view showing the brake in operation and the talking machine in idle position.

The operation of the device is as follows: The parts are shown in normal position in Fig. 2 where the arm 11 is in idle position and the brake is in operation. The cam 20 engages the cam 24, rocking the arm 25 upon the pivot 26 and causing the brake shoe 42 to engage the underside of the record support. The member 25 possesses sufficient resiliency to yield if undue force is applied to the disk, so that the disk will be gradually brought to a stop when the brake is applied and firmly held at rest after it has once been brought to a stop. When it is desired to start the machine, the sound box 9 is raised, whereupon the cam 20 is removed from the cam 24 and the spring 35 forces the forward end of the arm 25 downward, removing the brake shoe from contact with the disk and releasing the same, whereupon the motor starts the disk.

I have shown this particular embodiment of my invention and the particular details employed therein for the purpose of better describing the invention. I do not wish to be limited to this form or these details, as many departures may be made therefrom without departing from the spirit of the invention.

I claim:

1. In a device of the class described, the combination of a frame, a rotatable member mounted on said frame, an arm pivoted to said frame adapted to coöperate with said rotatable member, a brake lever pivoted in said frame to the underside of the top thereof, a hand on one end of said lever projecting through the top of the frame, a brake shoe on said hand adapted to engage the underside of said rotatable member when the brake is in operation, a cam on the other end of said lever and a finger carried by said pivoted arm for engaging said cam and operating said brake lever to brake the rotatable member.

2. In a device of the class described, the combination of a hollow frame, a rotatable member adapted to rotate on said frame, a hollow boss on said frame, a hollow arm pivoted to said boss, a finger mounted on said arm and projecting through said boss into the frame, a resilient brake lever and means to pivot said brake lever intermediate its ends to the underside of the top of the frame, a hand on one end of said lever projecting through the frame, a brake shoe on the end of said hand adapted to engage said rotatable member to brake the same, a cam on the other end of the lever coöperating with said finger, whereby the brake is operated through the movement of the hollow arm.

3. In a device of the class described, the combination of a frame, a rotatable disk adapted to rotate on said frame, a hollow sound conducting arm pivoted in said frame, a finger mounted in said hollow arm and projecting into said hollow frame and braking means mounted in said frame controlled by said finger.

4. In a device of the class described, the combination of a frame, a rotatable member in said frame, means forming a sound duct including a portion of the frame and a hollow sound conducting arm pivoted thereto, a finger mounted in said sound duct without obstructing the same controlled by said hollow arm and a brake for the rotatable member in said frame controlled by said finger.

5. In a device of the class described, the combination of a frame, a rotatable member in said frame, a sound duct including a portion of the frame and a hollow sound conducting arm, a flat finger mounted in said sound duct without obstructing the same controlled by said arm and braking means in said frame for said rotatable member controlled by said finger.

In witness whereof, I have signed my name hereunto this 10th day of June, 1916.

RAY H. MANSON.